Patented May 19, 1942

2,283,884

UNITED STATES PATENT OFFICE 2,283,884

PURIFICATION OF METAL HALIDE FLUXES

Charles E. Nelson, Midland, Mich., assignor to The Dow Chemical Company, Midland, Mich., a corporation of Michigan No Drawing. Application April 14, 1941, Serial No. 388,499

7 Claims. (Cl. 75—93)

This invention relates to an improved method of treating iron-contaminated metal halide metallurgical fluxes essentially comprising magnesium chloride to remove the iron impurities therefrom.

In certain metallurgical operations, such as the melting of magnesium-base alloys, it is customary to employ as fluxes metal halide mixtures comprising substantial proportions of magnesium chloride. These fluxes, as initially compounded, usually contain as impurity from 0.05 to 0.5 per cent by weight of iron, probably in the form of iron halides. Since this quantity of iron is in excess of that which may be tolerated in fluxing operations, it has been customary to remove such iron impurities from the fluxes by any of several procedures, most of which will effectively reduce the iron content of the flux to about 0.008 to 0.020 per cent by weight, a value sufficiently low for ordinary purposes.

However, in the preparation and handling of magnesium-base alloys of extremely high corrosion resistance, in which iron impurities can be tolerated only in the minutest amounts, the ordinary purified melting fluxes, containing 0.008 to 0.020 per cent of iron, are entirely useless, since they contaminate the alloy with iron. Purer fluxes are obviously necessary, but the problem of obtaining them has been a serious obstacle in the art, since the known methods of purifying metal halide fluxes, even when carried out with the greatest of care, are not capable of removing the iron impurities to a sufficiently low value. For instance, even when the molten flux has been treated with reducing agents to convert all the iron impurities to metallic iron and has been allowed to stand without agitation for periods as long as 24 hours, the iron impurities settle out only to a value of 0.008 per cent. In fact, in so far as applicant is aware, no method of producing metal halide fluxes of the degree of freedom from iron necessary for use in the making of highly corrosion resistant magnesium alloys has heretofore been available.

It is therefore an object of the invention to provide a simple and effective method of reducing the iron content of iron-contaminated metal halide metallurgical fluxes essentially comprising magnesium chloride to a value well below 0.008 per cent by weight, thereby rendering the fluxes suitable for use in the preparation of substantially iron-free magnesium-base alloys.

The invention depends upon the discovery that molten metallic magnesium containing less than 0.005 per cent by weight of iron, when mixed with molten iron-contaminated metal halide fluxes, acts in several different ways effectively to remove the iron therefrom. Of course, if any of the iron impurities are present as iron halides, these latter are at once reduced to metallic iron. However, even in the case of fluxes in which all the iron impurities are present in the reduced state, the added magnesium still exerts at least two distinct purifying actions. Thus, the magnesium tends to associate with itself part of the metallic iron impurities, probably by alloying therewith, and hence to withdraw them from the flux. The resulting iron-containing magnesium may then be entirely separated from the mass of flux, leaving the latter in a substantially higher state of purity. In addition, introduction of the magnesium into the flux has the further effect of rendering readily settleable part of the metallic iron impurities which, as already noted, will not otherwise settle from the flux at all. If, then, after the addition of the pure magnesium (which itself withdraws a substantial part of the iron impurities, as explained) the flux is maintained in a quiescent state, that further part of the iron impurities rendered settleable by the magnesium will gravitate to the bottom of the flux, effecting an additional purification of its upper portion.

In a preferred method of carrying the invention into practice, the molten iron-contaminated magnesium chloride-containing metal halide flux to be purified is usually heated in an iron-free container to a temperature above 650° C., and subdivided metallic magnesium containing less than 0.005 per cent iron is stirred into the flux, agitation being continued until the magnesium is molten and well mixed throughout the mass. Agitation is then stopped and the molten flux is maintained in a quiescent state for a time sufficient to permit the magnesium, together with that portion of the iron impurities which have become associated therewith during the stirring, to rise to the surface of the flux, and for that part of the iron impurities which were rendered settleable by the addition of magnesium to settle out and concentrate in the lower portion of the flux. The supernatant magnesium is then skimmed off and discarded or purified for reuse, and the upper purified portion of the flux, which is the desired product, is ladled out, either to be used at once or to be poured into iron-free molds in which it is allowed to solidify ready for subsequent use. The lower portion of the flux which contains settled iron impurities may then be discarded or re-used.

While the process of the invention is applicable to fluxes containing any amount of iron impurity, it is customary, in order to conserve the amount of substantially iron-free magnesium used, to apply the process principally to fluxes which have previously been treated by conventional methods to reduce the iron to as low a value as possible, viz., to about 0.008 to 0.020 per cent by weight of iron. A single treatment with iron-free magnesium according to the invention serves further to reduce the iron content of such fluxes to well below 0.008 per cent, usually to considerably below 0.003 per cent.

The metallic magnesium added to the flux during treatment according to the invention should, as noted, contain less than about 0.005 per cent by weight of iron. If a larger proportion of iron is present, purification of the flux does not result. Since commercial magnesium almost invariably contains iron in an amount equivalent to its solubility limit in molten magnesium, i. e., about 0.030 to 0.36 per cent, it is necessary to purify the magnesium prior to use in the present process. Such purification may conveniently be accomplished by sublimation or fractional distillation in known manner. The purified magnesium is usually added to the flux to be treated in a proportion between about 5 and about 50 per cent by weight of the latter, preferably 10 to 30 per cent for fluxes previously purified by conventional means and initially containing iron impurities in a proportion of 0.008 to 0.020 per cent. Operation must, of course, be carried out in an iron-free container, graphite or graphite-lined crucibles being particularly serviceable.

At the time of stirring the iron-free magnesium into the flux to be purified, the flux must be at a temperature above the melting point of the magnesium, i. e., above 650° C. However, after this operation is completed, the temperature during the subsequent settling step need not be maintained above this temperature, and may conveniently be allowed to fall below 650° C. so that the magnesium which rises to the surface of the molten flux may be removed as a solid. In the settling step, the molten flux should, of course, be maintained in a quiescent state for a time sufficient to permit all the added magnesium to rise to the surface of the melt and for iron impurities rendered settleable by the addition of magnesium to gravitate to the lower portion of the flux, 0.5 to 5.0 hours being usually required.

After the settling operation, the supernatant magnesium together with its associated iron impurities is skimmed off, and, if desired, freed of iron and re-used in subsequent treatments. The upper purified layer of the flux, which is clear and substantially white in color, is usually ladled into iron-free molds and allowed to solidify ready for use. The lower portion of the flux containing settled iron impurities, which may usually be distinguished by its slightly yellowish color, may be combined with additional iron-contaminated flux and reworked in a subsequent purification, or, if its iron content is too high for economical operation, may be withdrawn and subjected to conventional purification and then returned to the process.

The invention is applicable to the purification of any metal halide metallurgical flux essentially comprising magnesium chloride. It is particularly advantageous with fluxes containing a major proportion of magnesium chloride, and especially to mixtures consisting of magnesium chloride and sodium chloride, and to magnesium chloride alone.

The following example will serve to illustrate the invention, but is not to be construed as limiting its scope:

A 300 pound batch of flux consisting of 70 per cent by weight magnesium chloride and 30 per cent sodium chloride and containing 0.050 per cent of iron as impurity was heated in a graphite-lined iron pot to a temperature of 750° C. 50 pounds of sublimed magnesium crystals containing less than 0.001 per cent of iron was then stirred into the molten flux for several minutes, after which stirring was discontinued and the mixture was permitted to stand quietly for 4 hours, the temperature being allowed to fall to 500° C. After this period, the magnesium which had risen to the surface of the flux melt and had solidified was removed by skimming. The upper portion of the flux was ladled quietly into molds formed of metallic magnesium and allowed to solidify. In this way 140 pounds of purified flux containing 0.0008 to 0.001 per cent by weight of iron was obtained. The lower portion of the flux, containing some settled iron impurities, was allowed to remain in the crucible to serve as a "heel" for the next melt.

Other modes of applying the principle of the invention may be employed instead of those explained, change being made as regards the details described, provided the steps recited in any of the following claims or the equivalent thereof be employed.

I claim:

1. In a method of treating a molten iron-contaminated metal halide metallurgical flux essentially comprising magnesium chloride to remove the iron to a concentration well below 0.008 per cent by weight, the steps which comprise heating the molten flux out of contact with any iron-containing surface to a temperature above 650° C. and mixing therewith metallic magnesium containing less than 0.005 per cent by weight of iron, whereby iron impurities in the flux become associated with the added magnesium, and thereafter separating the magnesium and associated iron from the flux.

2. In a method of treating a molten iron-contaminated metal halide metallurgical flux essentially comprising magnesium chloride to remove the iron to a concentration well below 0.008 per cent by weight, the steps which comprise heating the molten flux out of contact with any iron-containing surface to a temperature above 650° C. and mixing therewith metallic magnesium containing less than 0.005 per cent by weight of iron, whereby iron impurities in the flux become associated with the added magnesium, and thereafter maintaining the molten flux in a quiescent state for a time sufficient to permit the magnesium together with associated iron to rise to the surface of the flux, and separating the thus purified flux from the supernatant magnesium.

3. In a method of treating an iron-contaminated metal halide metallurgical flux essentially comprising magnesium chloride to remove the iron to a concentration well below 0.008 per cent by weight, the steps which comprise: heating the molten flux out of contact with any iron-containing surface to a temperature above 650° C., and mixing therewith metallic magnesium containing less than 0.005 per cent by weight of iron, whereby the iron impurities in the flux become in part associated with the added magnesium and in part are rendered settleable; thereafter maintaining the molten flux in a quiescent state for a time sufficient to permit the settleable iron impurities to settle and the magnesium together with associated iron to rise to the surface of the flux; and separating the thus purified flux from the supernatant iron-containing magnesium and the settled iron impurities.

4. In a method wherein a metal halide metallurgical flux comprising a major proportion of magnesium chloride and containing as impurity between 0.008 and 0.020 per cent by weight of iron is treated to remove such iron to a proportion well below 0.008 per cent, the steps which comprise: heating the molten flux in an iron-free container at a temperature above 650° C. and adding thereto with agitation metallic magnesium containing less than 0.005 per cent by weight of iron, said magnesium being added in a proportion between about 5 and about 50 per cent by weight of the flux, whereby the iron impurities in the flux become in part associated with the added magnesium and are in part rendered readily settleable; thereafter discontinuing agitation and maintaining the molten flux in a quiescent state for a time sufficient for the settleable iron impurities to settle and concentrate in the lower portion of the flux and for the magnesium and associated iron impurities to rise to the surface of the flux; and then skimming off the supernatant magnesium, separating the upper purified portion of the molten flux from the lower iron-containing portion, and recovering the said purified flux.

5. A method according to claim 4, wherein the flux treated consists of a major proportion of magnesium chloride and a minor proportion of sodium chloride.

6. A method according to claim 4, wherein the flux treated consists of magnesium chloride.

7. A method according to claim 4 in which the magnesium is added in a proportion between 10 and 30 per cent by weight of the flux.

CHARLES E. NELSON.